United States Patent [19]
Wu

[11] Patent Number: 5,969,785
[45] Date of Patent: Oct. 19, 1999

[54] REFLECTIVE-TYPE LIQUID CRYSTAL DISPLAY USING POLARIZER FREE MIXED-MODE TWIST NEMATIC CELLS WITH DICHROIC DYE

[75] Inventor: Shin-Tson Wu, Northridge, Calif.

[73] Assignee: Hughes Electronics Corporation, El Segundo, Calif.

[21] Appl. No.: 09/237,504

[22] Filed: Jan. 26, 1999

Related U.S. Application Data

[62] Division of application No. 08/547,095, Oct. 23, 1995.

[51] Int. Cl.$^6$ ....................................................... G02F 1/13

[52] U.S. Cl. .......................................... 349/165; 349/181

[58] Field of Search .................................. 349/179, 181, 349/165

[56] References Cited

U.S. PATENT DOCUMENTS

| | | | |
|---|---|---|---|
| 4,252,417 | 2/1981 | Scheffer et al. | 349/131 |
| 4,291,949 | 9/1981 | Wada et al. | 349/130 |
| 4,396,250 | 8/1983 | Wada et al. | 349/81 |
| 4,398,803 | 8/1983 | Pohl et al. | 344/181 |
| 4,527,864 | 7/1985 | Dir | 349/165 |
| 4,556,286 | 12/1985 | Uchida et al. | 349/79 |
| 4,944,577 | 7/1990 | Yoshida | 349/179 |
| 5,361,151 | 11/1994 | Sonehara | 349/98 |
| 5,490,003 | 2/1996 | Van Sprang | 349/96 |
| 5,555,113 | 9/1996 | Mulkens | 349/181 |

OTHER PUBLICATIONS

Bahadur, "Liquid Crystal Applications and Uses", vol. 3, chapter 11, Singapore, 1992.

Schadt and Helfrich, "Voltage–Dependent Optical Activity of a Twisted Nematic Liquid Crystal", *Applied Physics Letters*, vol. 18, No. 4, Feb. 15, 1971, pp. 127–128.

Gooch and Tarry, "The optical properties of twisted nematic liquid crystal structures with twist angles ≤90°", *J. Phys. D:Appl. Phys.*, vol. 8, 1975, pp. 1575–1584.

Born and Wolf, Principals of Optics—Electromagnetic Theory of Propagation, Interference and Diffraction of Light, 6th ed., Pergamon Press, 1980, pp. 694–696.

Cole and Kashnow, "A new reflective dichronic liquid–crystal display device", *Applied Physics Letters*, vol. 30, No. 12, Jun. 15, 1977, pp. 619–621.

*Primary Examiner*—Kenneth Parker
*Attorney, Agent, or Firm*—V. D. Duraiswamy; M. W. Sales

[57] ABSTRACT

An optical display employs a liquid crystal cell with a $d\Delta n/\lambda$ of approximately 0.2–0.8, allowing the cell's optical transmissivity to be modulated by an applied electric field through a dominant non-polarization rotation effect. For visible wavelengths, $d\Delta n$ is approximately 0.1–0.4 microns, with a preferred value of about 0.25 microns. Applications include a reflective projection display in which input light is polarized at a greater than 0° and less than 90° angle, preferably about 20°, to the input LC directors of a twisted nematic cell; a reflective direct view system in which a quarter-wave plate is substituted for a polarization analyzer; and both a reflective and a transmissive guest-host system in which optical absorption by dye molecules is the dominant modulation mechanism.

2 Claims, 4 Drawing Sheets

REFLECTIVE-TYPE LIQUID CRYSTAL DISPLAY USING POLARIZER FREE MIXED-MODE TWIST NEMATIC CELLS WITH DICHROIC DYE

This is a division of application Ser. No. 08/547,095 filed Oct. 23, 1995 now abandoned.

BACKGROUND OF THE INVENTION

1. Field of the Invention

This invention relates to liquid crystal (LC) displays which operate with a dominant non-polarization rotation effect (PRE), and more particularly to LC displays based primarily upon birefringence or dye-doped absorption, together with operation below the LC's lowest PRE transmission maximum.

2. Description of the Related Art

Conventional 90° twisted nematic LC displays employ a polarizer in front of the LC cell and an analyzer behind the cell that is rotated 90° with respect to the polarizer. In the absence of an applied electric field across the cell, the polarization of input light is twisted 90° as it progresses through the cell, allowing for maximum optical transmission. (A 270° twist achieved with the addition of a chiral dopant to the LC is a conventional arrangement that can also be used. For purposes of this application, since a 270° twist results in essentially the same twisted polarization plane as a 90° twist, a 270° twist will be considered to be equivalent to and included within the general term 90° twist.) When full voltage is applied across the cell the LC directors, which originally were parallel to the cell boundaries, rotate to align with the field at right angles to the cell boundaries. This removes the twisting effect of the LC, leaving the polarization direction of input light unchanged as it traverses the cell and thus causing the analyzer to block the light transmission. This type of system is described, for example, in Schadt and Helfrich, "Voltage-Dependent Optical Activity of a Twisted Nematic Liquid Crystal", *Applied Physics Letters*, Vol. 18, No. 4, Feb. 15, 1971, pages 127-128. It is the commonly used system for transmission mode LC displays, such as notebook computers. However, it is not well suited for reflective mode operation because of its poor brightness.

To obtain a high contrast ratio it is desirable to maximize the cell's transmission when zero voltage is applied. The cell's transmission T with the LC directors perpendicular to the electric field is given by the equation:

$$T = 1 - \frac{\sin^2\left(\frac{\pi}{2}\sqrt{1+u^2}\right)}{1+u^2} \quad (1)$$

where $u=2d\Delta n/\lambda$, d is the cell thickness, $\Delta n$ is the difference between the LC's extraordinary and ordinary indices of refraction and $\lambda$ is the input light wavelength. This equation is derived from Gooch and Tarry, "The optical properties of twisted nematic liquid crystal structures with twist angles $\leq 90°$", *J. Phys. D:APPL. Phys.*, Vol. 8, 1975, pages 1575–1584.

The lowest value of u to satisfy the requirement T=1 is $\sqrt{3}$, at which $d\Delta n$ is approximately equal to $0.866\lambda$. Assuming $\lambda=0.55$ microns (micrometers) and using a typical value of 0.1 for $\Delta n$ yields a cell thickness d of 4.8 microns. Twisted nematic cells with a thicker LC layer would result in slower response times.

Twisted nematic cells of this type are commonly used for transmissive mode displays. However, the transmissive mode has a number of drawbacks. It requires a backlight for illumination which typically consumes the major portion of the available battery power. Also, transmissive mode displays are not suitable for reflection-type applications, such as direct view displays that utilize ambient light or projection displays. Reflective mode displays generally reduce power consumption, while at the same time they tend to boost brightness.

When a conventional twisted nematic LC cell of the type described above is used for reflective mode operation, however, the light modulation efficiency is greatly sacrificed. In a conventional projection scheme the input light is polarized and redirected 90° by a polarizing beam splitter (PBS), from which the light traverses the LC cell and is reflected back through the cell towards the PBS by a mirror on the other side of the cell. Since the polarized light is restored to its original polarization direction by traversing the LC cell twice in opposite directions, it is diverted by the PBS back towards its source, rather than transmitted as a projection output. This results in a relatively low net transmission for cell voltages below the LC tilt threshold.

As the applied cell voltage exceeds the threshold level, the PRE is broken and a small amount of light modulation occurs during the directors' reorientation. At voltages significantly greater than the threshold level, the LC directors are aligned parallel to the electric field so that the light polarization is not rotated and the PBS transmission therefore approaches zero. Thus, a twisted nematic cell operated to maximize T in equation (1) is not suitable for reflective mode operation.

One application of the Gooch and Tarry approach of selecting the LC cell parameters to maximize T for low modulation voltages is described in U.S. Pat. No. 4,398,803 to Pohl et al. This patent seeks to improve the viewing angle by setting $d\Delta n$ within the range of 0.15–0.6 microns. Like the other references described above, this patent is intended for transmissive rather than reflective mode applications, and relies upon the PRE. While the viewing angle is apparently improved, the brightness is significantly reduced as the cell thickness approaches the lower end of the stated range. Thus, "optimum properties" were noted for cells with $d\Delta n$ within the range of 0.45–0.50 microns.

Liquid crystal modulators that operate through the birefringence effect rather than PRE are also known. As opposed to PRE systems, in which the input light is polarized parallel to the input LC directors, the birefringence effect relies upon a substantial angle between the polarizations of the input light and the input LC directors, with a maximum modulation achieved at 45°. Utilization of the birefringence effect relies upon a difference between the ordinary and extraordinary phase retardations, rather than an LC twist. Ignoring constants, an equation for T in a birefringent operation can be obtained from Born and Wolf, *Principals of Optics—Electromacnetic Theory of Propagation, Interference and Diffraction of Light*, 6th ed., Pergamon Press, 1980, pages 694–696:

$$T = \sin^2 2\beta \sin^2 \delta 2 \quad (2)$$

where $\beta$ is the angle between the input light polarization and the input LC directors, and $\delta=2\pi d\Delta n/\lambda$. It can thus be seen that the birefringence effect is strongly dependent upon the wavelength $\lambda$; optimizing the system for one wavelength requires a significant sacrifice of efficiency for other wavelengths. The contrast ratio is decreased dramatically as the bandwidth of light increases.

A third type of LC light modulator involves doping the LC with dichroic dyes. This establishes a "guest-host" relationship in which the dye molecules align with the LC directors to absorb polarizations parallel to the cell's input face in the quiescent state. When a voltage is applied to the cell sufficient to rotate the LC directors to a right angle to the input cell face, the dye molecules rotate along with the LCs and allow a transmission through the cell. The need for an external polarizer is thus eliminated. One such system is described in Cole and Kashnow, "A new reflective dichroic liquid-crystal display device", *Applied Physics Letters*, Vol. 30, No. 12, Jun. 15, 1977, pages 619–621. However, it is suited only to a reflective mode operation, and requires the addition of a quarter-wave plate.

SUMMARY OF THE INVENTION

The present invention seeks to provide a new type of liquid crystal display that requires a low operating voltage but achieves a high brightness and also a high contrast ratio for all colors when operated with white light, has a wide viewing angle and a fast response time, is useful for reflective and projection displays and is not overly sensitive to wavelength, allows for transmissive mode operation in a dye-doped implementation and is compatible with conventional thin film transistor technology.

These goals are accomplished with a liquid crystal display in which d$\Delta$n is reduced below the level for maximum PRE transmission to the approximate range of 0.1–0.4 microns (with d$\Delta$n/$\lambda$ approximately 0.2–0.8 for typical wavelengths), and the LC cell's optical transmissivity is modulated through a dominant non-PRE mechanism. In one application that is based upon a combination of the birefringent effect and PRE, a reflective projection display is realized with a twisted nematic LC cell and a polarized optical input whose polarization axis is at a substantial angle $\beta$ to the input LC directors. The preferred value of d$\Delta$n is approximately 0.25 microns and the preferred value of $\beta$ is about 20°, as opposed to 45° for prior pure birefringence cells. The reflective display can also be implemented as a direct view system by the addition of a quarter-wave phase retarder that is preferably positioned between the system's polarizer and the input side of the LC cell.

The invention, including its limitation to d$\Delta$n being approximately 0.1–0.4 microns, is also applicable to dye-doped transmission and reflection displays implemented with a 90° twist.

These and other features and advantages of the invention will be apparent to those skilled in the art from the following detailed description, taken together with the accompanying drawings.

DETAILED DESCRIPTION OF THE INVENTION

Figure 1A:
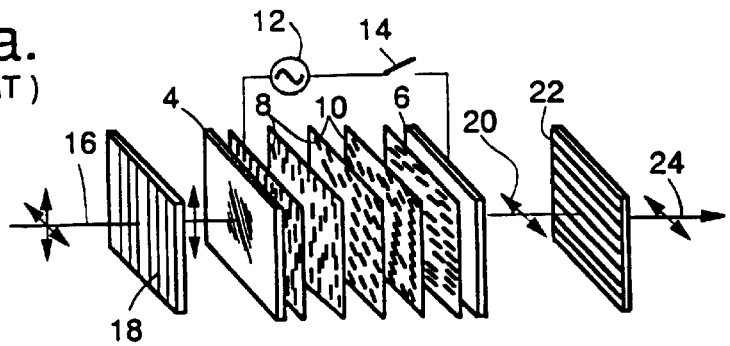
FIGS. 1a and 1b are simplified exploded perspective views illustrating the operation of a conventional twisted nematic LC cell.
Figure 1B:
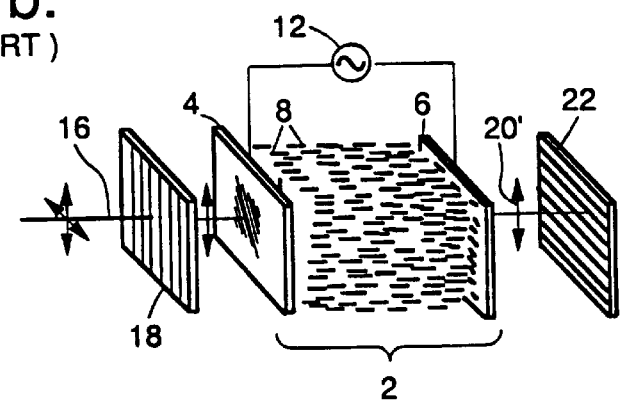

FIGS. 1a and 1b illustrate the operation of a conventional twisted nematic LC modulator in the transmissive mode. The LC cell 2 consists of a pair of parallel transparent plates 4 and 6, such as glass, which serve as electrodes when coated with a film of a transparent conductive material such as ITO (indium tin oxide) . A 200 nm thick polymer film is coated on the ITO to serve as an alignment layer for the adjacent LC molecules. A nematic LC between the two plates rotates helically about an axis normal to the plates (the axis of twist). If the twist angle is 90°, for example, the LC molecules have their directors 8 in the x direction at one of the plates and in the y direction at the other plate. For example, the LC directors are shown aligned in the y direction adjacent plate 4 and in the x direction adjacent plate 6; in both cases they are parallel to the planes of the plates.

The unitary cell 2 is illustrated in an exploded form in FIGS. 1a and 1b, with successive LC layers 10 that actually form a continuum shown separately. The LC directors for each successive layer are angularly twisted relative to the preceding layer, resulting in an overall "twist" from one plate to the other. A modulating voltage source 12 is connected across the electrodes of the opposed plates through a switch 14. An unpolarized input beam 16 which contains an image or other optical data is directed through a polarizing plate 18 so that it is polarized parallel to the LC directors upon entering the cell at the input plate 4. The polarization plane of the linearly polarized light traveling in the direction of the LC twist axis rotates along with the LC molecules, so that the cell acts as a polarization rotator. This is known as the polarization rotation effect (PRE). At the output of the cell the light polarization has been rotated 90° (assuming a 90° LC twist angle), so that its polarization 20 is in the x direction at the output of the cell. An analyzer, implemented with another polarizing plate 22 whose polarization plane is twisted 90° from that of polarizing plate 18, transmits the polarized beam as an output 24.

When the switch 14 is closed and a modulating voltage is applied across the cell's electrode plates 4 and 6, an electric field is established within the cell in the direction of the twist axis. This causes the LC molecules to tilt towards the field. When the applied modulating voltage is great enough to produce a 90° LC tilt, the LC molecules loose their twisted character (except for those adjacent to the boundary plate surfaces), so that the polarization rotational power is deactivated. This is illustrated in FIG. 1b, in which the LC directors 8 have been tilted 90° so that they are parallel to the beam 16 and at right angles to the boundary plates 4 and 6. As a result, the polarization 20' of the cell's output beam is the same as the beam's polarization at the input end of the cell, and the output beam is blocked by the cross-polarized analyzer 22. In effect, the analyzer acts as a shutter which transmits light in the absence of an electric field and blocks the light transmission when the field is applied. Lower modulating voltages that only partially tilt the LC molecules result in a partial transmittance and partial blocking of input light.

The transmissive display illustrated in FIGS. 1a and 1b can be converted to a reflective system by substituting a mirror for the analyzer 22. However, as described above conventional reflective systems suffer from poor modulation efficiency. A greatly improved reflective mode operation can be achieved with one embodiment of the invention, which is illustrated in FIG. 2.

Figure 2:
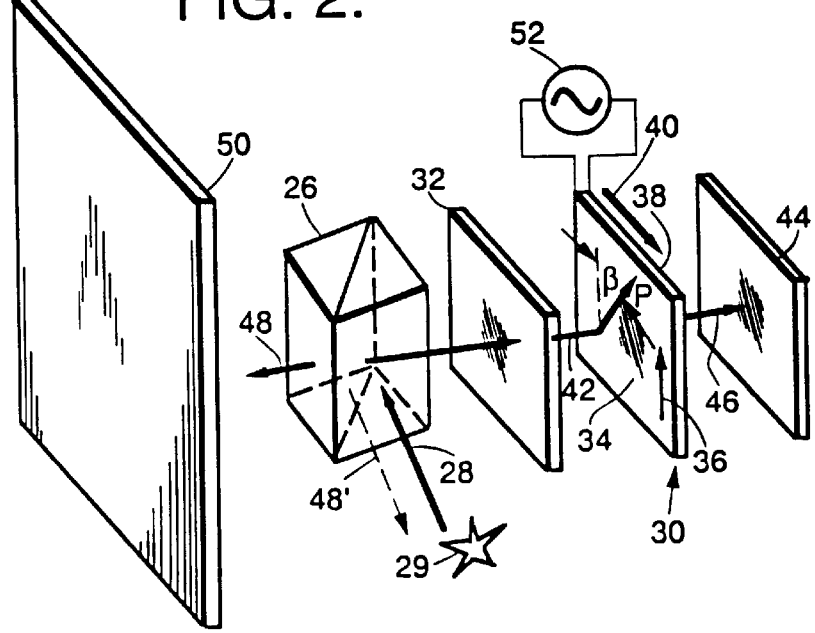
FIG. 2 is an exploded simplified perspective view of a projection display implementation of the invention.

The LC display of FIG. 2 is a projection display that does not rely upon the PRE as the dominant effect in modulating an input beam that is to be displayed. Rather, it employs a mixed-mode effect that combines both birefringence and the PRE to obtain a significantly higher brightness than would otherwise be available in a reflective system.

The new display includes an optical polarizer, preferably a polarizing beam splitter (PBS) 26 which receives an input beam 28 from a light source 29, which can be either a natural image, a human controlled source of optical information, or a uniform beam upon which an image is superimposed by the LC cell's modulation. The PBS polarizes the input beam and directs it to the input side of an LC cell 30. An optional phase retardation film 32 (either biaxial or uniaxial) can be provided on the input side of the cell to cancel the cell's residual phase at high modulating voltages to enhance the contrast ratio at a lower operation voltage.

The cell 30 is illustrated as a twisted nematic cell in which the LC directors adjacent the input plate 34 are oriented in the y direction, as indicated by arrow 36, with the LC directors adjacent the output plate 38 twisted by 90° to the x direction as indicated by arrow 40. While a 90° twist angle is preferred because it produces a high transmission efficiency at a relatively low modulating voltage level, smaller twist angles such as 70° can be employed to give a slightly higher maximum transmission efficiency, but at the cost of a higher modulating voltage requirement.

Unlike the conventional LC cell system of FIGS. 1a and 1b, in which the input light polarization is either 0° or 90° to the LC directors at the input side of the cell, the LC cell 30 is oriented relative to the PBS 26 so that the polarization vector P of the cell's input beam 42 is at an angle $\beta$ with its absolute value substantially greater than 0° and substantially less than 90° to the orientation 36 of the LC molecules at the input side of the cell. In contrast to prior birefringence cells, in which $\beta$ is typically 45° to maximize the birefringence effect, in the present invention an intermediate value of $\beta$ is preferably selected to obtain a mixed-mode birefringence/PRE operation in which the optical efficiency has been found to be maximized for a $\beta$ on the order of 20°. In further contrast to prior birefringence cells, which do not employ a LC twist, the preferred embodiments of this invention have a substantial LC twist.

A key to the invention is that the cell's d$\Delta$n be small enough that the PRE is only partial. This can be accomplished by making the cell very thin to obtain a low value of d and/or selecting a LC with a low value of $\Delta$n. For example, if the cell has a 90° LC twist but is thin enough, the input polarization P will experience less than a 90° rotation as the input beam transits the cell; the beam does not reside in the cell long enough to experience a full 90° rotation. This, coupled with $\beta$ being substantially greater than 0° and substantially less than 90°, results in a mixed mode operation that has been found to produce a significantly higher brightness and contrast ratio for a reflective system. The range of d$\Delta$n for successful operation of the invention is about 0.1–0.4 microns, with maximum optical efficiency achieved at about 0.25 microns. For visible light this translates to a permissible range of d$\Delta$n/$\lambda$ of about 0.2–0.8, with a preferred value on the order of 0.5.

To complete the description of the overall system, a mirror 44 (which may be coated on the inner side of the cell 30) reflects any cell output beam 46 back through the cell to the PBS 26. Here the component of the reflected beam 48 which is orthogonal to the input polarization vector P is projected onto a screen 50, while the component 48' that is parallel to P is diverted by the PBS along the axis of the original input beam 28 and away from the screen 50. A voltage source 52 applies a modulating voltage across the opposed cell electrode plates 34 and 38.

The system as shown provides a common modulation to the entire input beam 28. However, the invention is also applicable to the superimposing of an image onto a uniform input beam through the LC cell modulation so that different portions of the input beam receive different modulations at any given time. This can be accommodated by either providing redundant modulating systems of the type shown in FIG. 2, one for each pixel, or more preferably by establishing an active matrix pixel array on one of the electrode plates 34 or 38 and controlling the voltage applied to each pixel from voltage source 52 separately.

Figure 3A:
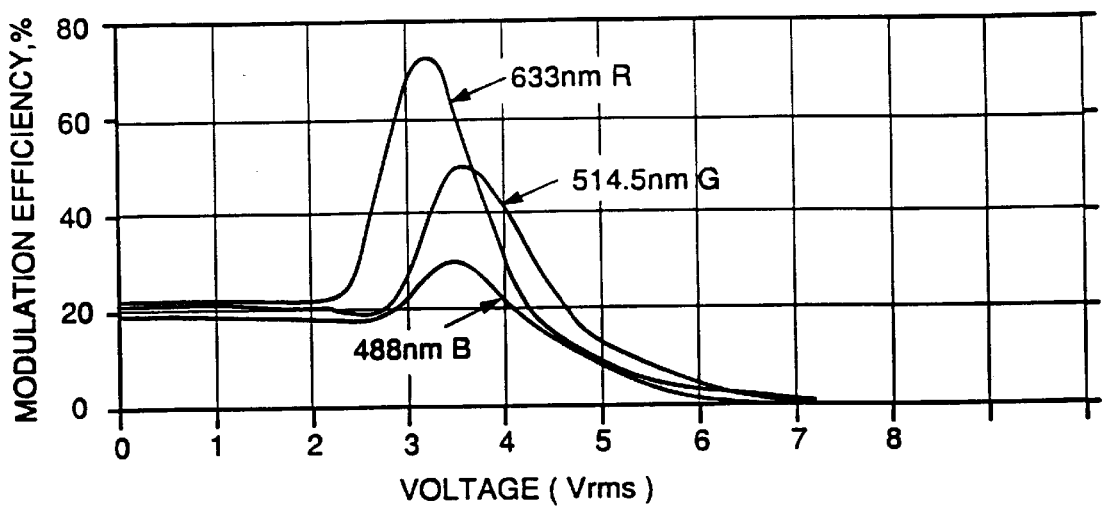
FIGS. 3a and 3b are graphs of modulation efficiency achieved by a conventional projection display and a projection display which uses the invention, respectively.

With prior reflective arrangements, most of the reflected light has the same polarization orientation as the input light to the cell at low modulating voltage levels, since the polarization of the reflected light is rotated an equal amount but in the opposite direction as the input beam. Thus, most of the reflected beam would be diverted away from the screen by the PBS. This is illustrated in FIG. 3a, which plots the light modulation efficiency of a conventional 90° twisted nematic LC cell whose d$\Delta$n is designed to maximize T through the PRE in accordance with the Gooch-Tarry equation (1). Modulation efficiencies for wavelengths of 448 nm (blue), 514.5 nm (green) and 633 nm (red) are shown.

FIG. 3a reflects the fact that, at modulation voltages less than the threshold for LC molecule reorientation (generally about 2–3 volts), the incident light follows the LC twist twice, once before and once after reflection, and is therefore deflected by the PBS to yield a low transmission level of about 20% or less. As the modulation voltage increases above the threshold level, generally in the range of about 3-4 volts, the PRE is broken and some modulation is observed during the LC directors' reorientation. For modulation voltages significantly in excess of the threshold level, generally greater than 5 volts, the LC directors are aligned by the electric field so that the modulation efficiency approaches zero for all of the wavelengths employed.

Figure 3B:
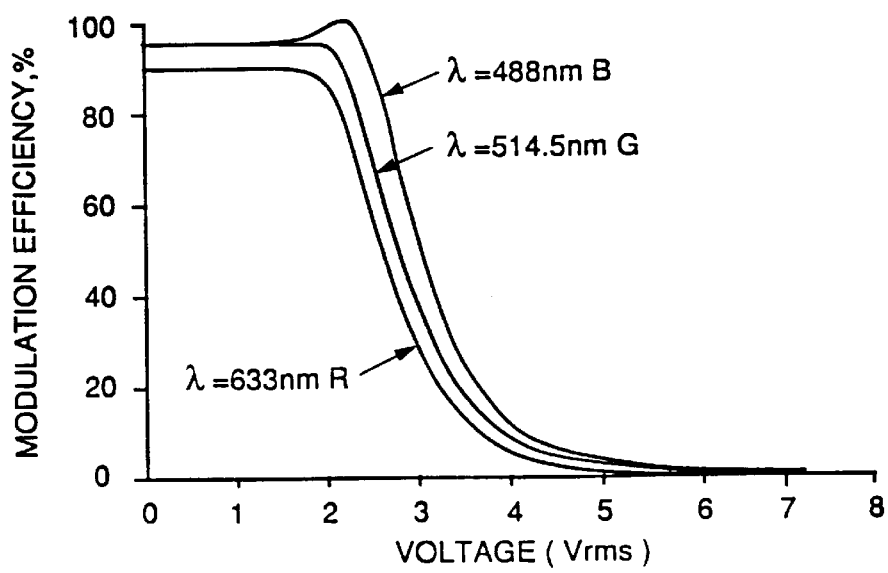

The results shown in FIG. 3a were obtained with d$\Delta$n set equal to approximately 0.5 microns. Reducing d$\Delta$n below this level also reduces the transmission efficiency in the transmissive mode, but has been found by the invention to actually substantially improve the transmission efficiency in the reflective mode. FIG. 3b illustrates test results with the same setup as for FIG. 3a, but with d$\Delta$n reduced by half to about 0.23 microns. The cell thickness d was 4.7 microns, while a $\Delta$n of 0.05 was obtained with a ZLI-2359 LC, which has a threshold voltage of about 2 Vrms. The transmission achieved for green light at modulation voltages below the threshold level was about 96%, the efficiency for blue light increased from about 96% to about 100% at the threshold, and the sub-threshold efficiency for red was about 90%. At a modulation voltage of approximate 7 volts a reasonably high contrast ratio of about 1000:1 was obtained. With the addition of a biaxial phase retardation film 32 having a d$\Delta$n of about −10 nm, the contrast ratio was improved to about 5000:1 for the HeNe laser beam studied.

The cell's response exhibited a frame time of about 25 ms, consisting of a 23 ms rise and a 2 ms decay. Substituting a LC with $\Delta$n of about 0.08 (such as MLC-9100) would reduce the LC thickness to about 3 microns, and thus improve the response time by a factor of about 2.

The low value of dΔn widens the cell's viewing angle, making it applicable to a direct view reflective display as well as the projection display described thus far. For both applications the new system exhibits a low operating voltage, high contrast ratio, high brightness for red, green and blue, a wide viewing angle and a fast response time.

Figure 4:
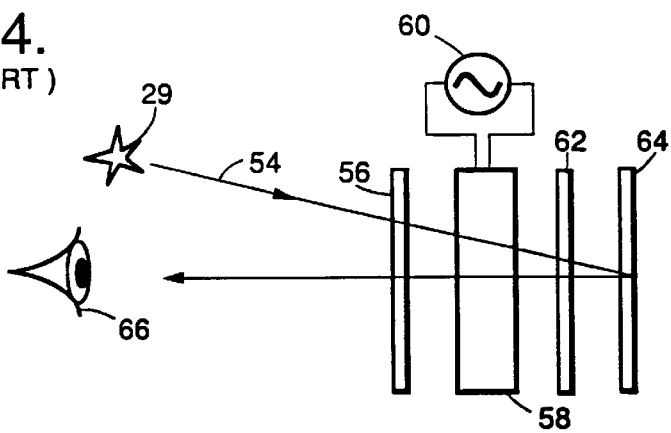
FIG. 4 is a block diagram of a conventional direct view reflective display.

To assist in understanding this application of the invention, a conventional direct view reflective display is shown in simplified form in FIG. 4. Incident light 54 is directed through a polarizer 56, which is generally a polymer-stretched sheet polarizer rather than a PBS because of the relatively large display areas typically required, onto a 90° twisted nematic LC cell 58, which is modulated by a voltage supply 60. The output from the cell is directed through a 90° crossed analyzer 62 and then reflected by a mirror 64 back through the system to the viewer 66. With dΔn set at about 0.5 microns in accordance with Gooch-Tarry, the incident polarized light follows the twist of the LC directors in the absence of a modulating voltage, and is transmitted through the crossed analyzer 62. The reflected light from the mirror 64 repeats the same process and is transmitted back through the sheet polarizer 56 to produce a bright state at null voltage. When the modulation voltage exceeds the threshold level enough to align the LC directors perpendicular to the cell boundaries, the incident light is absorbed by the crossed analyzer 62 to produce a good dark state.

A major problem of this system is its poor optical efficiency. The sheet polarizer 56 normally transmits only about 40% of an unpolarized beam, or about 75% of linearly polarized light. In the reflective mode the light has to pass both the sheet polarizer and the analyzer twice, resulting in a very low overall optical efficiency. On the other hand, this system has the advantage that it relies upon ambient light without a need for back light, and thus has a very low power consumption.

The system's optical efficiency could be improved by removing the analyzer 62. However, this would prevent the achievement of a good dark state. Thus, the conventional twisted nematic cell of FIG. 4 is not suitable for a reflective mode high contrast display even if only one polarizer is used.

Figure 5:
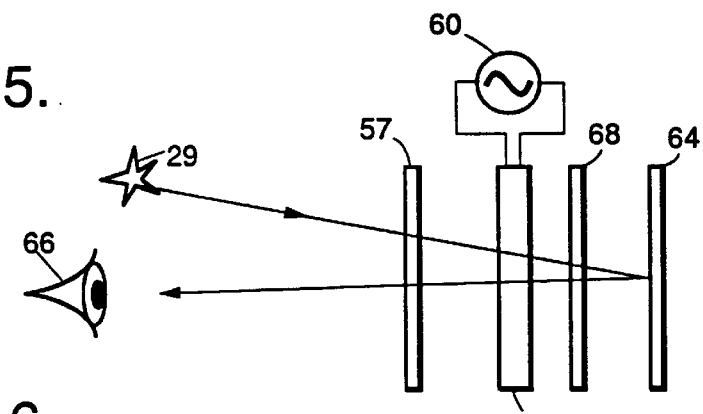
FIG. 5 is a block diagram of a new direct view reflective display in accordance with the invention.
Figure 6:
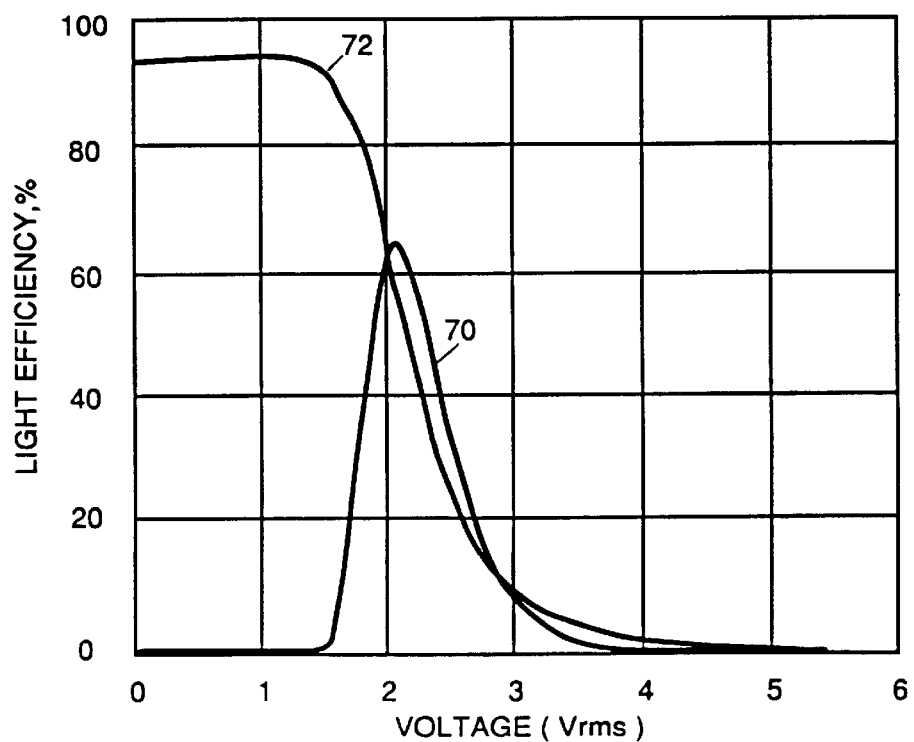
FIG. 6 is a graph comprising the transmission efficiencies of the FIG. 4 and FIG. 5 systems.

In another embodiment of the invention, a much improved reflective mode direct view display is achieved by (a) substituting a phase retarder, preferably a quarterwave plate, for the analyzer 62 of FIG. 4, and (b) substituting an LC cell with dΔn in the approximate range of 0.1–0.4 microns (dΔn/λ in the approximate range of 0.2–0.8) for the conventional Gooch-Tarry cell 58. Such a system is shown in FIG. 5, in which the analyzer 62 of FIG. 4 is replaced by a highly transparent quarter-wave plate 68 and a new LC cell 58' with dΔn in the approximate 0.1–0.4 microns range is employed. The results of these substitutions are shown in FIG. 6, which plots the systems' light efficiencies as a function of modulating voltage, and also orients the sheet polarizer 56 to establish a β angle between 0° and 90°, preferably on the order of 20°. As dΔn of the LC cell increases, β has to increase slightly to maintain maximum light efficiency.

FIG. 6 contrasts the light efficiency of a conventional dΔn=0.5 micron cell used in the system of FIG. 5 (curve 70) with the light efficiency of the new cell 58' with β=20° (curve 72), both taken at a wavelength of 633 nm and with a KHz voltage source 60. With the conventional cell, dark states are produced for both low and high modulating voltages because of absorption of the reflected beam by the polarizing sheet 56; some light leakage is observed at intermediate voltage levels at which some phase retardation of the LC cell is present. This produces a transmission curve 70 that peaks at slightly greater than 2 volts and falls to dark states at both lower and higher voltage levels. Such a system is not suitable for display applications both because the gray scale is difficult to control, and because a reversed contrast appears at modulation voltages higher than about 2.2 Vrms.

By comparison, the experimental results achieved with the new cell incorporating the invention as shown by curve 72, with dΔn approximately equal to 0.25 microns, is highly suitable for a direct view reflective system. The light efficiency at low voltages is approximately 93%, due to the combined PRE and birefringence effects. Thus, this mixed-mode 90° twisted nematic cell works as a tunable achromatic quarter-wave plate. The cell's effect phase retardation for each pass is about 90°, for a total phase retardation close to 180° in the reflective mode. Adding in the effect of the double pass through the quarter-wave plate, the total phase retardation is about 360°. Thus, a very high transmission is achieved in the voltage-off state. As the voltage increases, the phase retardation of the LC cell gradually vanishes. The light passes the quarter-wave plate twice and is blocked by the polarizer. As a result, a good dark state is observed.

Figure 7:
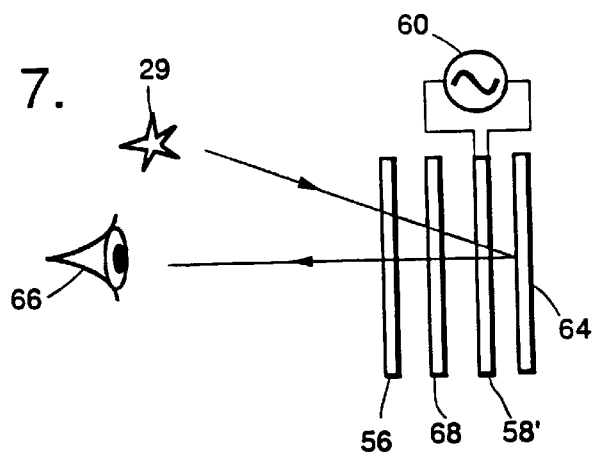
FIG. 7 is a block diagram of a preferred embodiment for the new direct view reflective display.

While the FIG. 5 system has greatly improved transmission characteristics, it suffers from parallax due to the quarter-wave plate's approximately 0.2 mm separation between the cell 58' and mirror 64. The system's resolution can be improved as illustrated in FIG. 7 by shifting the quarter-wave plate 68 from the output to the input side of the cell 58'. The quarter-wave plate is preferably laminated to the polarizer 56, with the mirror 64 provided on the inner surface of the cell's right hand boundary layer.

Figure 8:
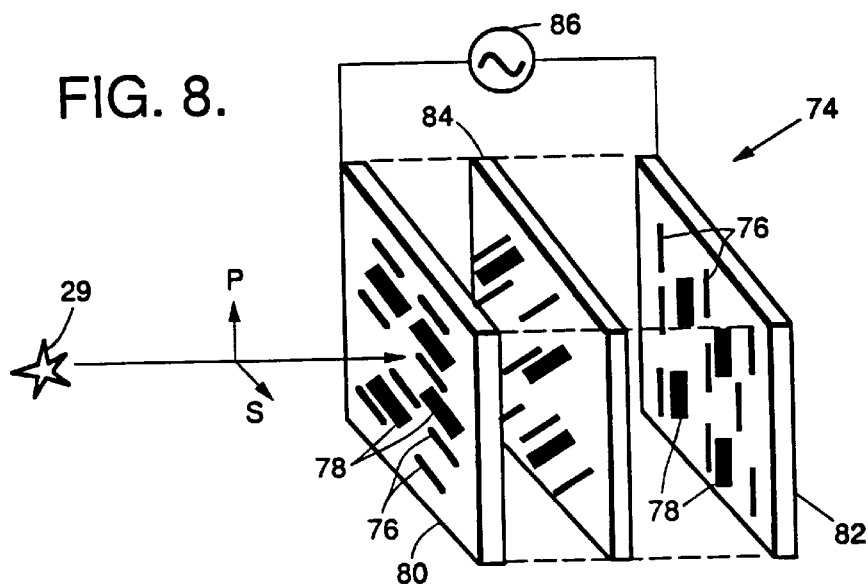
FIG. 8 is a simplified exploded perspective view of a transmissive dye-doped display incorporating the invention.

The invention is also applicable to both transmissive and reflective displays that employ a dye-doped LC to achieve a mixed mode operation. A transmissive display of this type is illustrated in simplified form in FIG. 8. It consists of a 90° (or 270°) twisted guest-host cell 74 in which the directors 76 of the host LC molecules are aligned parallel to each other, and light absorbent guest dye molecules 78 are interspersed in the LC and align with the LC directors. A chiral nematic LC host is preferably used, eliminating the need for a polarizer. The dye molecules are strongly absorbent to light that is polarized parallel to their principal axes, and strongly transmissive to light polarized perpendicular to their principal axes. When a high modulating voltage is applied to the cells, all of their LC directors and dyes are oriented perpendicular to their substrates so that very little absorption occurs and the cells are highly transmissive.

The host LCs typically contain a few percent of guest absorption dyes with a large dichroic ratio. For active matrix applications a high resistivity LC host mixture is employed. The overall light modulation efficiency depends upon the absorption coefficient of the dyes used. A suitable LC host is E-63, with a 3% nitro-amino azo benzene dye guest. This dye has an absorption peak at 477 nm, a dichroic ratio of 7.5, excellent solubility and a low viscosity.

The cell's boundary layers 80 and 82 are shown exploded from each other, with the LC and dye molecule orientations in the x direction for input layer 80 and in the y direction for output layer 82. Only one bulk layer 84 is shown between the input and output layers, with its LC and dye molecules rotated 45° to each of the outer layers. In practice there would be many intermediate bulk layers to produce a gradual 90° (or 270°) twist. A modulating voltage is applied across transparent electrodes on the two end layers from a voltage source 86.

As with the reflective systems discussed previously, the dΔn of cell 74 is in the approximate range of 0.1–0.4 microns (dΔn/A approximately 0.2–0.8) to prevent the PRE from dominating. If dΔn were at the conventional Gooch-Tarry value, in the dark state with no modulation voltage applied one of the polarization components (S in FIG. 8) would follow the twist gradually and always be parallel to the LC directors. As a result, this component would be absorbed quickly as the beam traverses through the guesthost cell. On the other hand, the remaining polarization component (P in FIG. 8) would always be normal to the LC directors and would thus be transmitted. The display contrast would accordingly be quite poor. Experimental results confirm that the contrast with the FIG. 8 cell is much better. Since the PRE is only partial because of the deliberately low value of dΔn, the P polarization component also encounters at least partial alignments with the dyes and is mostly absorbed.

Figure 9:
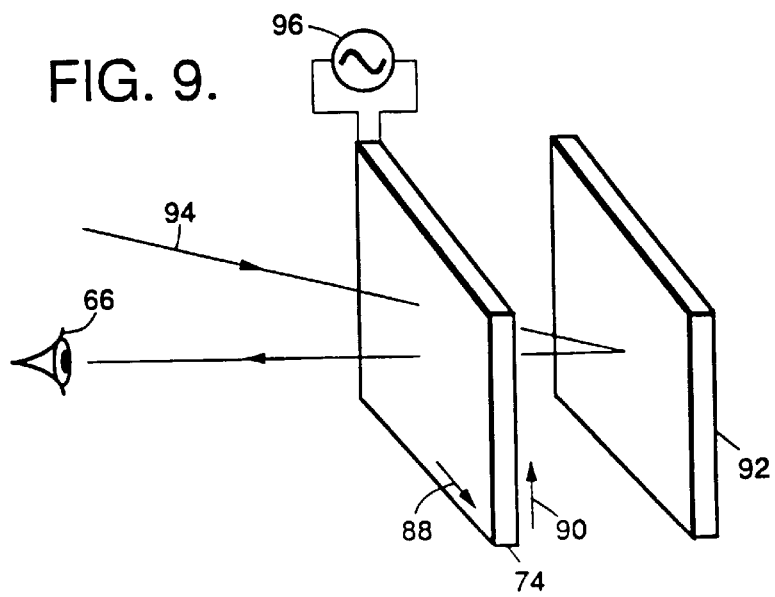
FIG. 9 is a simplified exploded perspective view of a reflective dye-doped embodiment.

A reflective dye-doped display is illustrated in FIG. 9. The same LC cell as in the transmissive embodiment is employed, with dΔn in the approximate 0.1–0.4 microns range, the LCs on the input side aligned in the x direction (arrow 88) and the LCs on the output side twisted 90° to the y direction (arrow 90). A mirror 92, which may be coated onto the output side of the cell, reflects ambient light 94 back to the viewer 66, and a modulating signal is applied to the cell from a voltage supply 96. As with the transmissive embodiment of FIG. 8, the elimination of both a polarizer and a quarter-wave plate improves brightness and also contrast. The dual mode rather than pure dye-absorption operation again provides a truer dark state.

While several illustrative embodiments of the invention have been shown and described, numerous variations and alternate embodiments will occur to those skilled in art. Such variations and alternate embodiments are contemplated, and can be made without departing from the spirit and scope of the invention as defined in the appended claims.

I claim:

1. A reflective liquid crystal display comprising:

a liquid crystal (LC) cell having an input side, an output side, a reflector at its output side positioned to reflect light that has been transmitted through the cell back through the cell, and a dΔn in the approximate range of 0.1–0.4 microns, where d is the thickness of the LC cell in microns and Δn is the difference between the LC's ordinary and extraordinary refractive indices, the LCs on the input side of said cell being oriented with their directors at a substantial non-zero angle to the directors of the LC on the output side of said cell, the LC in said cell being doped with an optically absorbent dye whose orientation and absorption characteristics are controlled by the LC orientation, and said electrode modulating the cell's transmissivity through a predominant dye-absorption effect, and electrodes positioned to establish an electric field through the cell to modulate the cell's optical transmissivity through a dominant non-polarization rotation effect in accordance with an electrical signal applied to said electrodes, said display including neither a polarizer nor a quarter-wave plate in its modulating effect.

2. A reflective liquid crystal display comprising:

a liquid crystal (LC cell having an input side, an output side, a reflector at its output side positioned to reflect light that has been transmitted through the cell back through the cell, and a dΔn within a Predetermined range, where d is the thickness of the LC cell in microns and Δn is the difference between the LC's ordinary and extraordinary refractive indices, the LCs on the input side of said cell being oriented with their directors at a substantial non-zero angle to the directors of the LC on the output side of said cell, the LC in said cell being doped with an optically absorbent dye whose orientation and absorption characteristics are controlled by the LC orientation, and said electrodes modulating the cell's transmissivity through a predominant dye-absorption effect, and electrodes positioned to establish an electric field through the cell to modulate the cell's optical transmissivity in accordance with an electrical signal applied to said electrodes, the dΔn of said cell being small enough that the polarization rotation effect does not dominate said modulation, said display including neither a polarizer nor a quarter-wave plate in its modulating effect.

* * * * *